United States Patent
Kato

(10) Patent No.: US 6,300,852 B1
(45) Date of Patent: Oct. 9, 2001

(54) STALK SWITCH HAVING A LATCH MECHANISM FOR THE CONTROL LEVER

(75) Inventor: Hironori Kato, Miyagi-ken (JP)

(73) Assignee: Alps Electric Co., Ltd., Tokyo (JP)

( * ) Notice: Subject to any disclaimer, the term of this patent is extended or adjusted under 35 U.S.C. 154(b) by 0 days.

(21) Appl. No.: 09/709,768

(22) Filed: Nov. 10, 2000

(30) Foreign Application Priority Data

Nov. 18, 1999 (JP) .................................................. 11-328421

(51) Int. Cl.[7] ....................................................... H01H 3/04
(52) U.S. Cl. ....................... 335/170; 335/207; 200/61.54; 200/327; 200/556
(58) Field of Search ................................ 335/205–7, 170, 335/179, 128, 157; 200/61.27, 61.54, 323–5, 327, 556

(56) References Cited

U.S. PATENT DOCUMENTS

| 2,734,963 | * | 2/1956 | Ardia ..................................... 335/170 |
| 4,868,530 | * | 9/1989 | Ahs ........................................ 335/207 |
| 5,780,794 | | 7/1998 | Uchiyama et al. ................ 200/61.54 |
| 5,886,603 | * | 3/1999 | Powell .............................. 335/170 X |

* cited by examiner

Primary Examiner—Renee Luebke
(74) Attorney, Agent, or Firm—Brinks Hofer Gilson & Lione

(57) ABSTRACT

In a stalk switch, a control lever is rotatably supported on a housing, and a driving member is slidably held on the base end of the control lever via a first spring. A sectionally V-shaped cam surface is provided inside the housing, and an end of the driving member is pressed into contact with a cam surface, whereby the control lever can be rotated between the neutral position and the left and right operating positions. A stopper member is slidably supported on the housing, and the stopper member is urged by a second spring having an urging force smaller than that of the first spring so as to project from the valley of the cam surface. An attraction member is attached to a rotating member rotating operatively associated with the slide of the stopper member, and an electromagnet is attached to the housing so as to oppose the attraction member. When the control lever is rotated to the operating position, the attraction member is attracted by the electromagnet, whereby the stopper member is held in a state projected from the valley of the cam surface, and the driving member is latched in the operating position by the stopper member.

8 Claims, 2 Drawing Sheets

STALK SWITCH HAVING A LATCH MECHANISM FOR THE CONTROL LEVER

BACKGROUND OF THE INVENTION

1. Field of the Invention

The present invention relates to a stalk switch attached to a steering column or the like of an automobile to operate turn signal lamps or wipers, and more particularly, to a latch mechanism for latching a control lever in an operating position.

2. Description of the Related Art

A left stalk switch and a right stalk switch are usually attached to a steering column of an automobile. One stalk switch is called a "turn signal switch" and used for operating turn signal lamps, and the other stalk switch is used for operating wipers or the like. Of these stalk switches, the turn signal switch rotatably supports a control lever on a housing integrally formed with the steering column. By rotating the control lever from a neutral position to either of left and right turn signal positions, a lamp for turning to the left or the right is flashed, and by rotating the control lever in a direction perpendicular to the turn signal position, beam switching or flashing for passing is performed. In this case, the control lever is latched in the operating position, such as the turn signal position or the beam switching position, and is automatically or manually returned to the neutral position when a steering wheel is rotated in a direction opposite to the indicated direction.

Hitherto, a latch mechanism for a control lever has been widely used in which a driving member is slidably held at the base end of the control lever via a spring, and the driving member is pressed into contact with a cross-sectionally V-shaped cam surface that is provided in the housing. In the conventional latch mechanism, a projection is formed in the middle of an inclined surface of the cam surface. By rotating the control lever from the neutral position to the operating position, the driving member slides from a valley to a peak of the cam surface against an urging force of the spring, and the control lever is latched in the operating position at the time the driving member passes over the projection.

According to the conventional latch mechanism, since the control lever is latched in the operating position by locking the driving member with the projection of the cam surface, the control lever cannot be securely latched unless the urging force of the spring for urging the driving member to the cam surface is set to be large. For this reason, the rigidity of the base end of the control lever must be increased by increasing the thickness thereof, and the rigidity of the housing must be increased by increasing the thickness of the cam surface, whereby the overall size of the stalk switch is increased. In addition, since a spring having a large urging force is used, a large amount of force is required to rotate the control lever, and the length between the rotation support and the terminal end of the control lever is necessarily increased, whereby the size of the stalk switch is also increased.

SUMMARY OF THE INVENTION

Accordingly, it is an object of the present invention to provide a small stalk switch which can be rotated by a small amount of force.

According to the present invention, there is provided a stalk switch including: a housing having a V-shaped cam surface in cross section; a control lever rotatably supported on the housing; a driving member movably held by the control lever; a first elastic member for urging the driving member in the direction to press into contact with the cam surface; a stopper member disposed so as to be set in and out of a valley of the cam surface; a second elastic member for urging the stopper member in the direction opposite to the direction in which the first elastic member urges the driving member with a force smaller than the force of the first elastic member; an electromagnet capable of attracting an attraction member provided on the stopper member; and a position detecting device for detecting the rotational operation of the control lever from a neutral position to an operating position;

wherein electric current is passed through a coil of the electromagnet by detecting signals from the position detecting device, and the electromagnet attracts the attraction member to hold the stopper member in a projected state during the passage of electric current, whereby the stopper member latches the driving member in the operating position; and wherein the driving member presses in the stopper member by the urging force of the first elastic member against the urging force of the second elastic member when electric current is not passed through the coil.

With the arrangements, when the control lever is rotated to the operating position, the stopper member is held in a state projected from the valley of the cam surface by the attracting action of the electromagnet, and the driving member is securely latched in the operating position. Therefore, the urging force of the first elastic member can be set to be small, the control lever can be rotated with a small amount of force, and the size of the stalk switch can be reduced.

In the stalk switch of the present invention, the electromagnet may preferably be disposed behind the cam surface, and the stopper member may preferably be passed through the electromagnet.

With the arrangements, not only the size of the control lever, but also the size of the housing can be reduced, whereby the size of the stalk switch is suitably reduced.

In addition, in the stalk switch of the present invention, the position detecting device may preferably be composed of a movable contact provided on the control lever and a fixed contact provided in the housing.

With this arrangement, when the position detecting device is of a contact type, if the movable contact is provided on the control lever, the fixed contact is provided in the housing, and electric current is passed through the coil of the electromagnet based on the ON signal generated when the movable contact comes into contact with the fixed contact, the size of the stalk switch can be reduced. In addition, when the position detecting device is of a magnet type, if the magnet is provided on the control lever, the magnet sensor is provided in the housing, and electric current is passed through the coil of the electromagnet based on the change in outputs from the magnetic sensor when the control lever is rotated to the operating position, the size of the stalk switch can be reduced. In this case, if the magnet and the magnetic sensor are disposed so as to be displaced from each other in the neutral position in the rotation direction of the control lever, the operating positions of the control lever in two different directions can be detected by a common magnetic sensor.

In addition, in the above arrangements, when the control lever is unlatched, the passage of electric current through the coil may be stopped by the output of a steering angle sensor or the like, or the control lever may be manually rotated to the neutral position. Therefore, it is possible to freely set unlatching timing.

DESCRIPTION OF THE PREFERRED EMBODIMENTS

Figure 1:
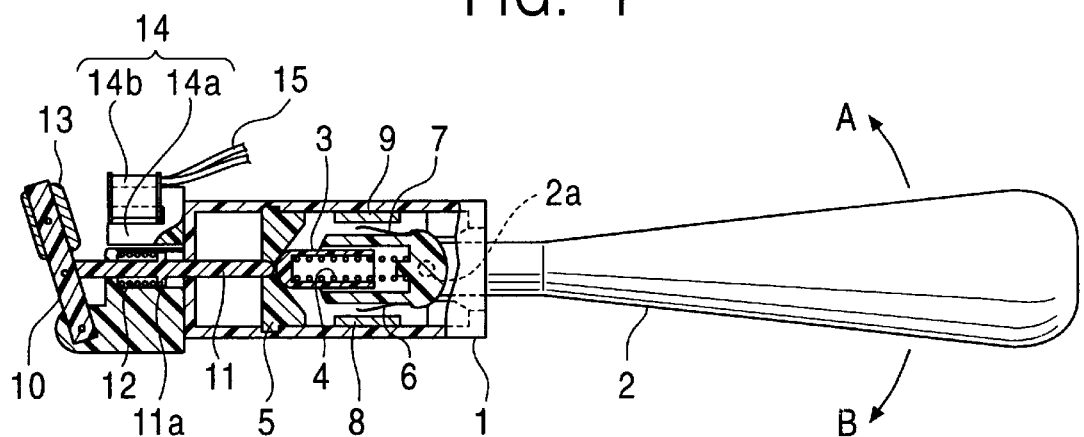
FIG. 1 is a partially cutaway side view showing the neutral state of a stalk switch according to a first embodiment of the present invention.

A first embodiment of a stalk switch according to the present invention will now be described with reference to FIGS. 1 to 3.

Referring to the figures, a control lever 2 is rotatably supported on a housing 1 made of synthetic resin around a spindle 2a. A driving member 3 is slidably held at the base end of the control lever 2, and the driving member 3 is pressed into contact with a cam surface 5 provided inside the housing 1 by an urging force of a first spring 4. The cam surface 5 is formed to have a V-shape in cross section. While the driving member 3 slides between the valley and the peak of the cam surface in accordance with the rotational operation of the control lever 2, it is stably held at the valley of the cam surface 5 when a rotational operating force to the control lever 2 is removed. A pair of movable contacts 6 and 7 are attached to the base end of the control lever 2, and a pair of counter electrodes 8 and 9 opposing the movable contacts 6 and 7 are attached on the inside surface of the housing 1. The counter electrodes 8 and 9 have fixed contacts (not shown) separated from each other via a predetermined gap, and the movable contacts 6 and 7 corresponding to the counter electrodes 8 and 9 come into contact with the fixed contacts, whereby the counter electrodes 8 and 9 are operated to be in the ON state to detect the position of the control lever 2.

On the other hand, a rotating member 10 is rotatably supported at the rear end of the housing 1, and a rod-like stopper member 11 is rotatably connected to the center of the rotating member 10. The stopper member 11 is slidably supported on the housing 1, and the tip thereof is exposed from the valley of the cam surface 5. A second spring 12 is provided between a flange 11a formed in the center of the stopper member 11 and the housing 1, and the stopper member 11 is urged by an urging force of the second spring 12 so as to project from the valley of the cam surface 5. The urging force of the second spring 12 is, however, set to be sufficiently smaller than the urging force of the first spring 4 urging the driving member 3. When the driving member 3 and the stopper member 11 lie on the same line, as shown in FIG. 1, the stopper member 11 is set within the valley of the cam surface 5 against the urging force of the second spring 12. An attraction member 13 consisting of a magnetic material is rotatably attached to an end of the rotating member 10, and an electromagnet 14 is attached to the rear end of the housing 1 so as to oppose the attraction member 13. The electromagnet 14 is composed of a U-shaped magnetic core 14a consisting of a ferromagnetic material and a coil 14b disposed to be linked to the magnetic core 14a, and an end face of the magnetic core 14a opposes the attraction member 13. A pair of lead wires 15 leading from the electromagnet 14 are electrically connected to the counter electrodes 8 and 9, respectively. When the counter electrodes 8 and 9 are operated to be in the ON state, electric current passes through the coil 14b of the electromagnet 14, whereby a strong magnetic field is produced in a magnetic circuit including the magnetic core 14a.

The thus-constructed stalk switch is used with the housing 1 integrally fixed to a steering column (not shown) or the like. In this embodiment, however, the stalk switch generates signals for operating the turn signal lamps or the like, and is used as a turn signal switch. In use, when the control lever 2 is in the neutral position shown in FIG. 1, the driving member 3 is stably held at the valley of the cam surface 5 by the urging force of the first spring 4, and the stopper member 11 is set within the valley of the cam surface 5 against the urging force of the second-spring 12. In this case, the attraction member 13 is separated from the electromagnet 14, the movable contacts 6 and 7 are not in contact with the counter electrodes 8 and 9, both of the counter electrodes 8 and 9 are in the OFF state, and electric current is not passed through the coil 14b.

When the control lever 2 is rotated from the neutral position shown in FIG. 1 in the direction of the arrow A in the figure, the movable contact 6 comes into contact with the counter electrode 8 to operate the counter electrode 8 to be in the ON state at the time the control lever 2 is rotated by a predetermined angle. As a result, a lamp for turning to the left (not shown) is flashed, and electric current is supplied to the coil 14b via the lead wires 15 by a controller or the like (not shown), whereby a strong magnetic field is produced in a magnetic circuit including the magnetic core 14a of the electromagnet 14. In addition, when the control lever 2 is rotated in the direction of the arrow A in this way, the driving member 3 slides on one inclined surface 5a of the cam surface 5 against the urging force of the first spring 4, so that the stopper member 11 is projected from the valley of the cam surface 5 by the urging force of the second spring 12, and the rotating member 10 is rotated with the projection of the stopper member 11.

Figure 2:
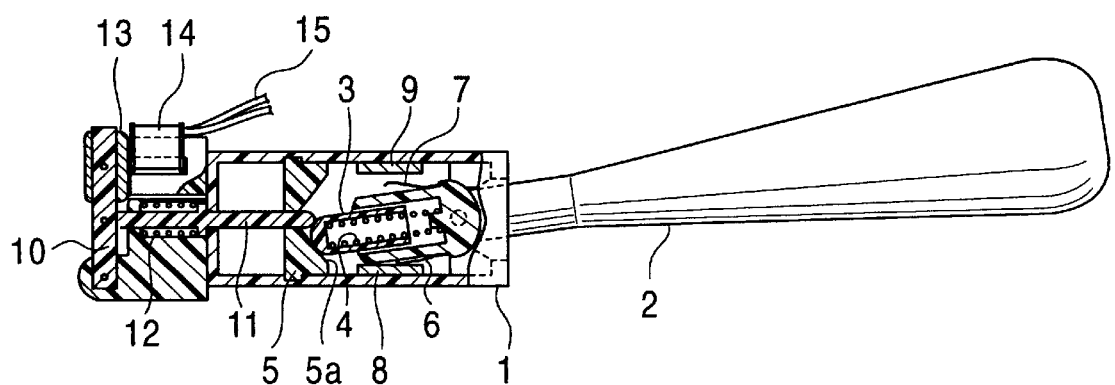
FIG. 2 is a partially cutaway side view showing the left-operating state of the stalk switch.
Figure 3:
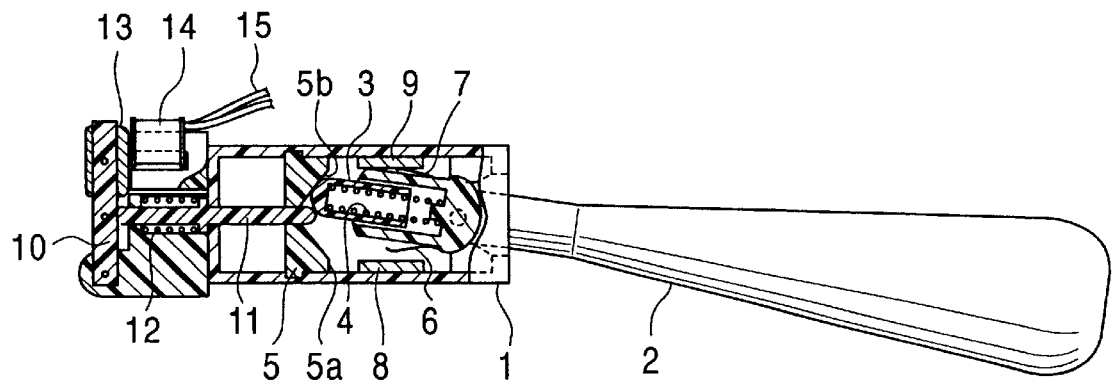
FIG. 3 is a partially cutaway side view showing the right-operating state of the stalk switch.

When the control lever 2 is rotated to a left-operating position shown in FIG. 2, the attraction member 13 attached to the rotating member 10 abuts against the electromagnet 14, and since a strong magnetic field is produced in the magnetic circuit of the electromagnet 14 as described above, the attraction member 13 is magnetically attracted to the magnetic core 14a of the electromagnet 14. Therefore, by the attracting action of the electromagnet 14, the stopper member 11 is held in a state projected from the valley of the cam surface 5, the driving member 3 is maintained in a latched state by the stopper member 11 such that it is held in pressing-contact with the inclined surface 5a of the cam surface 5, and the control lever 2 is latched in the left-operating position shown in FIG. 2.

When the control lever 2 is unlatched, if the supply of electric current is stopped at a predetermined angle by a steering angle sensor (not shown) or the like, the attracting action of the electromagnet 14 is terminated, so that the stopper member 11 is pressed by the driving member 3 to be set within the valley of the cam surface 5, and the driving member 3 slides on the inclined surface 5a of the cam surface 5 to return to the neutral position shown in FIG. 1. When the control lever 2 is manually rotated from the left-operating position shown in FIG. 2 to the neutral position, the passage of electric current through the coil 14b is stopped and the attracting action of the electromagnet 14 is terminated at the time the movable contact 6 is separated from the counter electrode 8. Therefore, the stopper member 11 is pressed by the driving member 3 to be set within the valley of the cam surface 5, and the driving member 3 slides on the inclined surface 5a of the cam surface 5 to return to the neutral position shown in FIG. 1.

In contrast to the above, when the control lever 2 is rotated from the neutral position shown in FIG. 1 in the direction of the arrow B in the figure, basically, a similar operation is performed, except that the movable contact 7 comes into contact with the other counter electrode 9 to flash a lamp for turning to the right and to pass electric current through the coil 14b and that the driving member 3 slides on the other inclined surface 5b of the cam surface 5 instead of the inclined surface 5a. That is, if the control lever 2 is rotated to a right-operating position shown in FIG. 3, the attraction member 13 attached to the rotating member 10 abuts against the electromagnet 14 and the attraction member 13 is magnetically attracted by the magnetic core 14a of the electromagnet 14, whereby the driving member 3 is maintained in a latched state by the stopper member 11 such that it is held in pressing-contact with the inclined surface 5b of the cam surface 5, and the control lever 2 is latched in the right-operating position shown in FIG. 3.

In the above first embodiment, when the control lever 2 is rotated to the left and right operating positions, the stopper member 11 is held in a state projected from the valley of the cam surface 5 by the attracting action of the electromagnet 14, and the driving member 3 is securely latched in the operating position by the stopper member 11. Therefore, the urging force of the first spring 4 for urging the driving member 3 to the cam surface 5 can be set to be small, and the control lever 2 can be rotated with a small amount of force. In addition, high rigidity is not required for the base end of the control lever 2 and the cam surface 5, and the size of the overall stalk switch can be reduced.

A second embodiment of the stalk switch according to the present invention will now be described with reference to FIGS. 4 to 6. In the figures, the components corresponding to those in FIGS. 1 to 3 are indicated by the same reference numerals.

In the stalk switch of this embodiment, an electromagnet 14 is attached to a housing 1 disposed behind the cam surface 5, and a stopper member 11 passes through a magnetic core 14a and a coil 14b of the electromagnet 14.

An attraction member 13 is fixed to the rear end of the stopper member 11, and the stopper member 11 is urged by an urging force of a second spring 12 provided between the attraction member 13 and the rear end of the housing 1 so as to project from the trough of the cam surface 5. As in the case of the above-described first embodiment, although not shown in FIGS. 4 to 6, a driving member 3 is pressed into contact with the cam surface 5 by an urging force of a first spring, and the urging force of the second spring 12 is set to be sufficiently smaller than the urging force of the first spring. A magnet 16 is fixed to the outer surface of the base end of the control lever 2, and a Hall element 17, serving as a magnetic sensor, is fixed to the inner surface of the housing 1. As is apparent from FIG. 4, the magnet 16 and the Hall element 17 are disposed so as to be displaced from each other in the neutral position in the rotation direction of the control lever 2. When the control lever 2 is rotated in the direction of the arrow A or B in FIG. 4, the distance between the magnet 16 and the Hall element 17 varies, and the passage of electric current through the coil 14b of the electromagnet 14 is controlled by a voltage output from the Hall element according to the variation in the distance.

Figure 4:
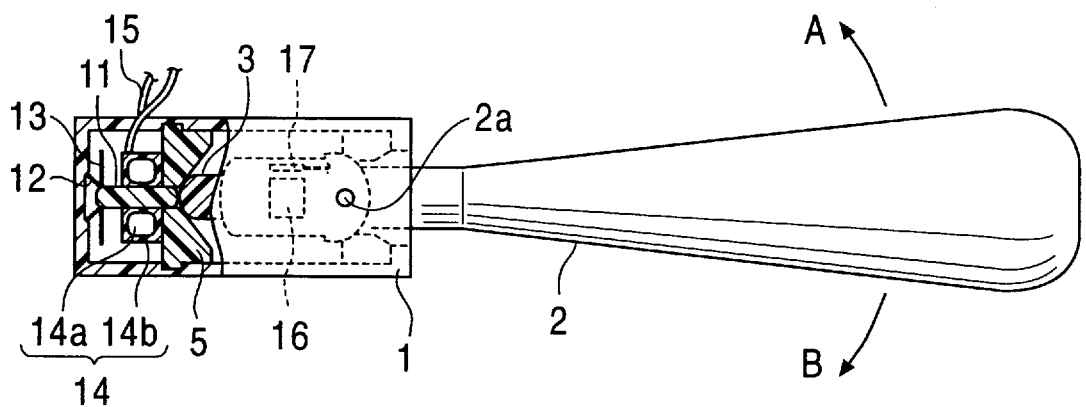
FIG. 4 is a partially cutaway side view showing the neutral state of a stalk switch according to a second embodiment of the present invention.

In the thus-constructed stalk switch, when the control lever 2 is in the neutral position shown in FIG. 4, the driving member 3 is stably held at the trough of the cam surface 5 by the urging force of the first spring (not shown), and the stopper member 11 is set within the trough of the cam surface 5 against the urging force of the second spring 12. In this case, the attraction member 13 is separated from the electromagnet 14. In addition, a voltage of, for example, 2.5V is output from the Hall element 17 located at a position separated from the magnet 16 by a predetermined distance, and electric current is not passed through the coil 14b of the electromagnet 14.

When the control lever 2 is rotated from the neutral position shown in FIG. 4 in the direction of the arrow A in the figure, the magnet 16 gradually moves away from the Hall element 17, so that the output voltage of the Hall element 17 drops from 2.5V. At the time the voltage of, for example, 1.0V is output from the Hall element 17, a lamp for turning to the left (not shown) is flashed, electric current is supplied to the coil 14b via lead wires 15, whereby a strong magnetic field is produced in a magnetic circuit including the magnetic core 14a of the electromagnet 14. In addition, when the control lever 2 is rotated in the direction of the arrow A in this way, the driving member 3 slides on one inclined surface 5a of the cam surface 5 against the urging force of the first spring, so that the stopper member 11 is projected from the valley of the cam surface 5 by the urging force of the second spring 12, and the attraction member 13 fixed to the rear end of the stopper member 11 approaches the electromagnet 14 with the projection of the stopper member 11. When the control lever 2 is rotated to a left-operating position shown in FIG. 5, the attraction member 13 abuts against the electromagnet 14, and since a strong magnetic field is produced in the magnetic circuit of the electromagnet 14 as described above, the attraction member 13 is magnetically attracted to the magnetic core 14a of the electromagnet 14. Therefore, by the attracting action of the electromagnet 14, the stopper member 11 is held in a state projected from the valley of the cam surface 5, the driving member 3 is maintained in a latched state by the stopper member 11 such that it is held in pressing-contact with an inclined surface 5a of the cam surface 5, and the control lever 2 is latched in the left-operating position shown in FIG. 5.

Figure 5:
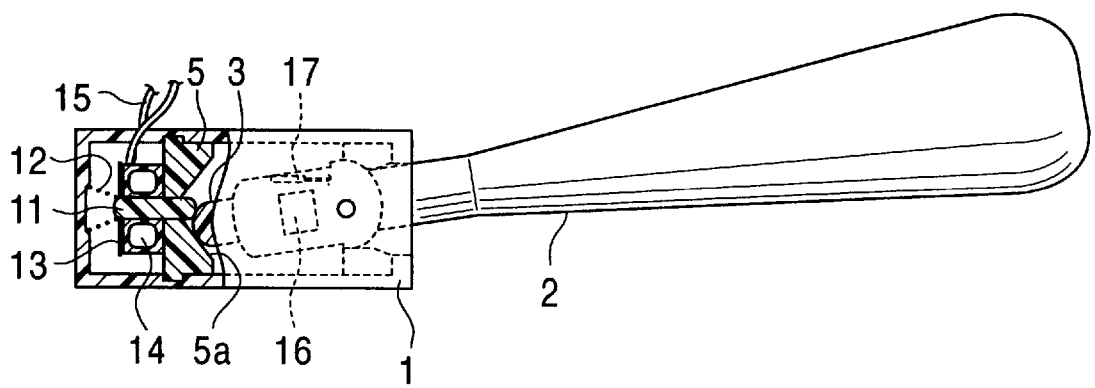
FIG. 5 is a partially cutaway side view showing the left-operating state of the stalk switch.
Figure 6:
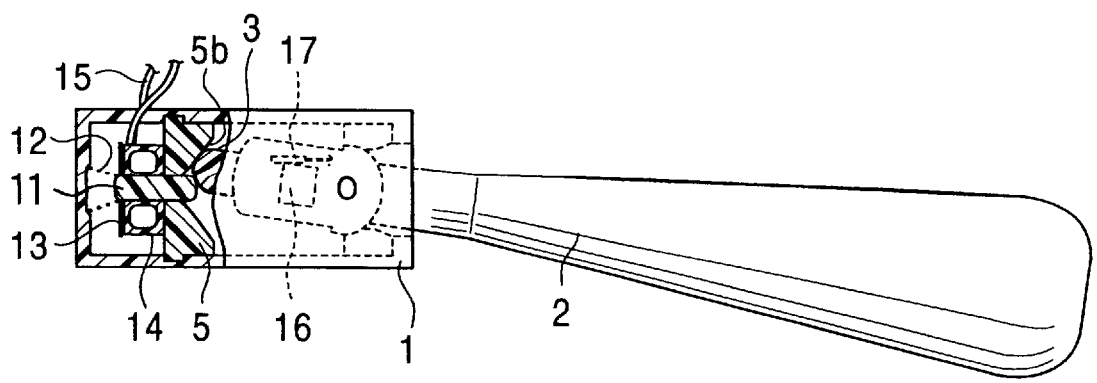
FIG. 6 is a partially cutaway side view showing the right-operating state of the stalk switch.

When the control lever 2 is rotated from the left-operating position shown in FIG. 5 to the neutral position, the passage of electric current through the coil 14b is stopped and the attracting action of the electromagnetic 14 is terminated at the time the magnet 16 approaches the Hall element 17 by a predetermined distance. Therefore, the stopper member 11 is pressed by the driving member 3 to be set within the valley of the cam surface 5, and the driving member 3 slides on the inclined surface 5a of the cam surface 5 to return to the neutral position shown in FIG. 4.

In contrast to the above, when the control lever 2 is rotated from the neutral position shown in FIG. 4 in the direction of the arrow B in the figure, the magnet 16 gradually approaches the Hall element 17, so that the output voltage of the Hall element 17 increases from 2.5 V. At the time the voltage of, for example, 5.0 V is output from the Hall element 17, a lamp for turning to the right (not shown) is flashed, electric current is supplied to the coil 14b via the lead wires 15, whereby a strong magnetic field is produced in the magnetic circuit including the magnetic core 14a of the electromagnet 14. In this case, as the driving member 3 slides on the other inclined surface 5b of the cam surface 5 and the stopper member 11 is projected from the valley of the cam surface 5 by the urging force of the second spring 12, the attraction member 13 fixed to the rear end of the stopper member 11 approaches the electromagnet 14. If the control lever 2 is rotated to a right-operating position shown in FIG. 6, the attraction member 13 abuts against the electromagnet 14, and the attraction member 13 is magnetically attracted to the magnetic core 14a of the electromagnet 14. Therefore, by the attracting action of the electromagnet 14, the stopper member 11 is held in a state projected from the valley of the cam surface 5, the driving member 3 is maintained in a latched state by the stopper member 11 such that it is held in pressing-contact with the inclined surface 5b of the cam surface 5, and the control lever 2 is latched in the right-operating position shown in FIG. 6.

In the second embodiment, as in the case of the first embodiment, when the control lever 2 is rotated to the left and right operating positions, the stopper member 11 is held in a state projected from the valley of the cam surface 5 by the attracting action of the electromagnet 14, and the driving member 3 is securely latched in the operating position by the stopper member 11. Therefore, the urging force of the first spring for urging the driving member 3 to the cam surface 5 can be set to be small, and the control lever 2 can be rotated with a small amount of force and moreover, high rigidity is not required for the base end of the control lever 2 and the cam surface 5, whereby the size of the overall stalk switch can be reduced.

Furthermore, since the stopper member 11 is passed through the electromagnet 14 disposed behind the cam surface 5, not only the size of the control lever 2, but also the size of the housing 1 can be reduced, whereby the size of the stalk switch can be further reduced.

Furthermore, since the magnet 16 and the Hall element 17 are disposed to be displaced from each other in the neutral position in the rotation direction of the control lever 2, the operating positions of the control lever 2 in two different directions can be detected by one Hall element 17.

While the control lever 2 is rotated only in the left and right turn signal directions in the above-described embodiments, it is possible to perform beam switching or flashing for passing by rotating the control lever 2 in the direction perpendicular to the turn signal directions. In this case, the control lever 2 may be rotatably supported on the housing 1 around another spindle perpendicularly intersecting the spindle 2a, and another inclined surface extending in the direction perpendicular to both the inclined surfaces 5a and 5b may be formed on the cam surface 5. In this case, although the output voltage of the Hall element 17 varies with the variation in the distance between the magnet 16 and the Hall element 17, if the value of the output voltage is adjusted to be different from the value of the output voltage of the Hall element 17 at the latched position of the control lever 2 rotated in the left and right turn signal directions or the neutral position, the rotation position of the control lever 2 in the left and right turn signal directions and in the direction perpendicular thereto can be detected by the magnet 16 and the Hall element 17. Of course, it is apparent that another Hall element may be provided according to the rotation of the control lever 2 in the directions perpendicular to the turn signal directions.

In addition, the stalk switch of the present invention can of course be applied to another switch, such as a wiper switch or the like.

Furthermore, the present invention is not limited to the above-described embodiments, and various modifications can be made. For example, a contact-type position detecting device composed of the movable contacts 6 and 7 and the counter electrodes 8 and 9 in the first embodiment can be replaced with a magnet-type position detecting device composed of the magnet 16 and the Hall element 17 in the second embodiment, or a push switch can be used as a contact-type position detecting device.

The present invention offers the following advantages. Since the stopper member is held in a state projected from the trough of the cam surface by the attracting action of the electromagnet, and the driving member is latched in the operating position when the control lever is rotated in the operating position, the driving member is securely latched in the operating position even if the urging force of an elastic member urging the driving member to the cam surface is set to be small. Therefore, the control lever can be rotated by a small amount of force, and the size of the stalk switch can be reduced.

What is claimed is:

1. A stalk switch comprising: a housing having a V-shaped cam surface in cross section; a control lever rotatably supported on the housing; a driving member movably held by the control lever; a first elastic member to urge the driving member in a direction to press into contact with the cam surface; a stopper member disposed so as to be set in and out of a valley of the cam surface, a second elastic member to urge the stopper member in a direction opposite to the direction in which the first elastic member urges the driving member, the second elastic member urging the driving member with a force smaller than a force of the first elastic member urging the driving member; an electromagnet capable of attracting an attraction member provided on the stopper member; and a position detector to detect a rotational operation of the control lever from a neutral position to an operating position;

wherein electric current is passed through a coil of the electromagnet by detecting signals from the position detector, and the electromagnet attracts the attraction member to hold the stopper member in a projected state during the passage of electric current, whereby the stopper member latches the driving member in the operating position; and wherein the driving member presses in the stopper member by the force of the first elastic member and against the force of the second elastic member when electric current is not passed through the coil.

2. A stalk switch according to claim 1, wherein the position detector is composed of a movable contact provided on the control lever and a fixed contact provided in the housing.

3. A stalk switch according to claim 1, wherein the position detector is composed of a magnet provided on the control lever and a magnetic sensor provided in the housing.

4. A stalk switch according to claim 3, wherein the magnet and the magnetic sensor are displaced from each other when the control lever is in the neutral position.

5. A stalk switch according to claim 1, wherein the electromagnet is disposed behind the cam surface, and the stopper member is passed through the electromagnet.

6. A stalk switch according to claim 5, wherein the position detector is composed of a movable contact provided on the control lever and a fixed contact provided in the housing.

7. A stalk switch according to claim 5, wherein the position detector is composed of a magnet provided on the control lever and a magnetic sensor provided in the housing.

8. A stalk switch according to claim 7, wherein the magnet and the magnetic sensor are displaced from each other when the control lever is in the neutral position.

* * * * *

UNITED STATES PATENT AND TRADEMARK OFFICE
CERTIFICATE OF CORRECTION

PATENT NO. : 6,300,852 B1
DATED : October 9, 2001
INVENTOR(S) : Hironori Kato

It is certified that error appears in the above-identified patent and that said Letters Patent is hereby corrected as shown below:

Claim 1,
Line 7, immediately after "surface" delete "," (comma) and substitute -- ; -- (semicolon) in its place.

Signed and Sealed this

Ninth Day of April, 2002

Attest:

Attesting Officer

JAMES E. ROGAN
Director of the United States Patent and Trademark Office